United States Patent
Lee et al.

(10) Patent No.: US 9,674,871 B2
(45) Date of Patent: Jun. 6, 2017

(54) METHOD FOR EXECUTING RANDOM ACCESS PROCEDURE IN WIRELESS COMMUNICATION SYSTEM AND APPARATUS THEREFOR

(71) Applicant: LG ELECTRONICS INC., Seoul (KR)

(72) Inventors: Seungmin Lee, Anyang-si (KR); Hanbyul Seo, Anyang-si (KR); Hakseong Kim, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 14/376,528

(22) PCT Filed: Feb. 25, 2013

(86) PCT No.: PCT/KR2013/001484
§ 371 (c)(1),
(2) Date: Aug. 4, 2014

(87) PCT Pub. No.: WO2013/125922
PCT Pub. Date: Aug. 29, 2013

(65) Prior Publication Data
US 2014/0376486 A1    Dec. 25, 2014

Related U.S. Application Data

(60) Provisional application No. 61/602,573, filed on Feb. 23, 2012, provisional application No. 61/604,534, (Continued)

(51) Int. Cl.
*H04W 74/08* (2009.01)
*H04W 72/12* (2009.01)

(52) U.S. Cl.
CPC ... *H04W 74/0833* (2013.01); *H04W 72/1278* (2013.01)

(58) Field of Classification Search
CPC .................................................. H04W 74/08
See application file for complete search history.

(56) References Cited

U.S. PATENT DOCUMENTS 9,320,023 B2 * 4/2016 Nory ................. H04W 72/0406
2010/0296467 A1 11/2010 Pelletier et al.
(Continued)

FOREIGN PATENT DOCUMENTS

KR    10-2010-0114852 A    10/2010
KR    10-2011-0020170 A    3/2011
(Continued)

*Primary Examiner* — Huy D Vu
*Assistant Examiner* — Teisha D Hall
(74) *Attorney, Agent, or Firm* — Birch, Stewart, Kolasch & Birch, LLP

(57) ABSTRACT

Disclosed is a method for a terminal to execute a random access procedure in a wireless communication system. Specifically, the method comprises the steps of: transmitting a random access preamble message to one or more nodes; receiving a random access response message from a serving cell from among the one or more nodes; and transmitting an uplink signal to a different node from among the one or more nodes, wherein the random access response message comprises information for transmitting the uplink signal to the different node.

12 Claims, 11 Drawing Sheets

Related U.S. Application Data filed on Feb. 29, 2012, provisional application No. 61/605,760, filed on Mar. 2, 2012.

(56) References Cited

U.S. PATENT DOCUMENTS

| | | |
|---|---|---|
| 2010/0303039 A1 | 12/2010 | Zhang et al. |
| 2011/0045837 A1 | 2/2011 | Kim et al. |
| 2012/0300714 A1* | 11/2012 | Ng .................... H04W 56/0045 370/329 |
| 2012/0307821 A1 | 12/2012 | Kwon et al. |
| 2013/0044665 A1* | 2/2013 | Ng ..................... H04W 52/242 370/311 |
| 2013/0322339 A1* | 12/2013 | Ohta ...................... H04L 5/001 370/328 |

FOREIGN PATENT DOCUMENTS

| | | |
|---|---|---|
| KR | 10-2011-0093632 A | 8/2011 |
| KR | 10-2011-0129951 A | 12/2011 |

* cited by examiner

FIG. 2
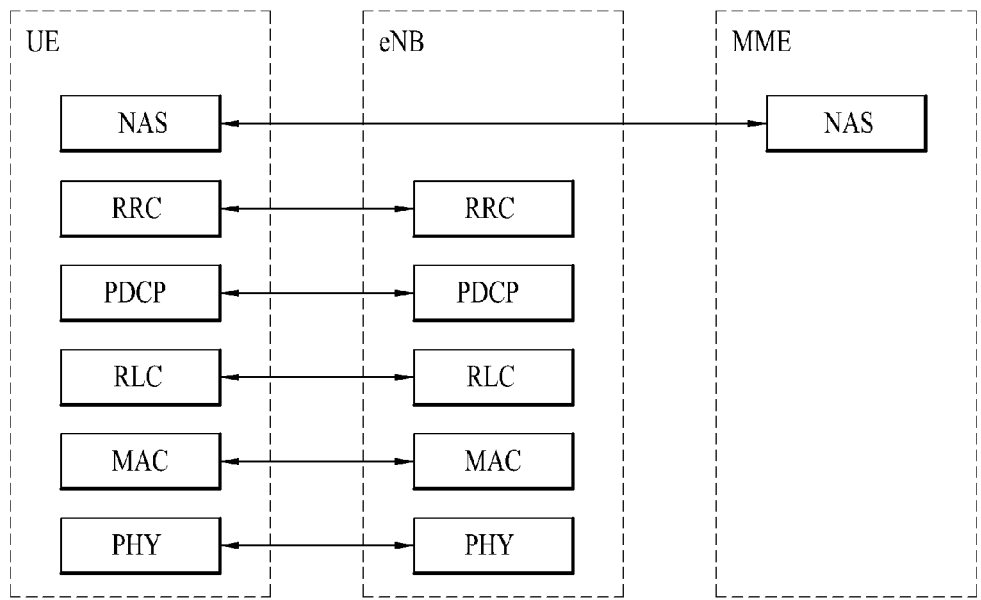
(a) contol - plane protocol stack
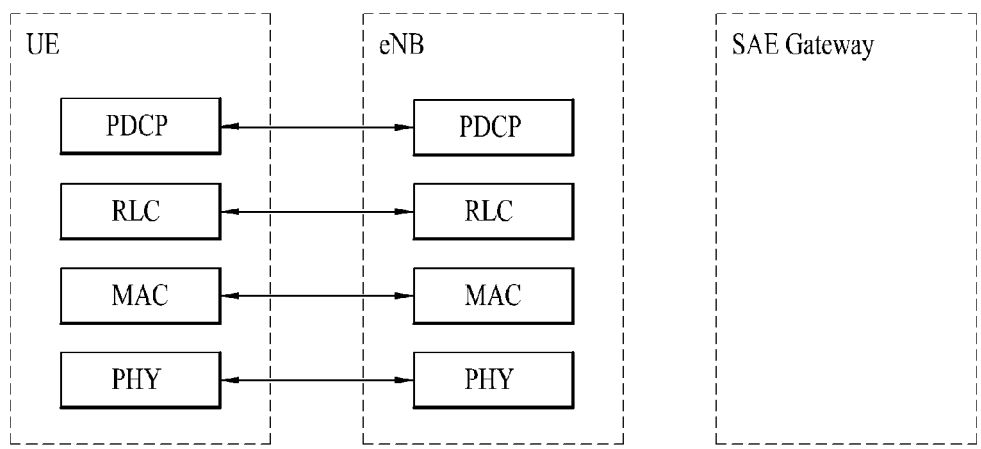
(b) user - plane protocol stack

METHOD FOR EXECUTING RANDOM ACCESS PROCEDURE IN WIRELESS COMMUNICATION SYSTEM AND APPARATUS THEREFOR

CROSS REFERENCE TO RELATED APPLICATIONS

This application is the National Phase of PCT International Application No. PCT/KR2013/001484, filed on Feb. 25, 2013, which claims priority under 35 U.S.C. 119(e) to U.S. Provisional Application No. 61/602,573, filed on Feb. 23, 2012; 61/604,534 filed on Feb. 29, 2012, and 61/605,760 filed on Mar. 2, 2012, all of which are hereby expressly incorporated by reference into the present application.

TECHNICAL FIELD

The present invention relates to a wireless communication system, and more particularly, to a method of performing a random access procedure in a wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of performing a random access procedure in a wireless communication system and an apparatus therefor in the following description based on the discussion mentioned earlier in the foregoing description.

Technical Solution

To achieve these and other advantages and in accordance with the purpose of the present invention, as embodied and broadly described, according to one embodiment, a method of performing a random access procedure, which is performed by a user equipment in a wireless communication system, includes the steps of transmitting a random access preamble to one or more nodes, receiving a random access response message from a serving cell among the one or more nodes and transmitting an uplink signal to a different node among the one or more nodes, wherein the random access response message includes information configured to transmit the uplink signal to the different node.

And, the method can further include the step of receiving a contention resolution message from the different node. In this case, the random access response message includes information configured to receive the contention resolution message from the different node.

Preferably, the random access response message can include information on a control channel to which information for retransmission of the uplink signal is transmitted.

And, the random access response message can include information on a control channel scheduling a reception of the contention resolution message. In this case, the control channel scheduling the reception of the contention resolution message is different from a control channel scheduling a reception of the random access response message.

Moreover, the random access response message includes information on an unlink reference signal which is transmitted together with the uplink signal. And, the random access response message includes information on a downlink reference signal which is transmitted together with the contention resolution message.

Preferably, the one or more nodes are configured to transceive a signal with the user equipment using a CoMP (coordinated multi point) scheme.

To further achieve these and other advantages and in accordance with the purpose of the present invention, according to a different embodiment, a user equipment device in a wireless communication system includes a wireless communication module configured to transceive a signal with one or more nodes and a processor configured to process the signal, the processor configured to transmit a random access preamble signal to the one or more nodes, the processor configured to receive a random access response signal from a serving cell among the one or more nodes, the processor configured to control the wireless communication module to transmit an uplink signal to a different node among the one or more nodes, wherein the random access response signal includes information configured to transmit the uplink signal to the different node.

Advantageous Effects

According to embodiment of the present invention, a user equipment can efficiently perform a random access procedure in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

BEST MODE

Mode for Invention

Figure 1:
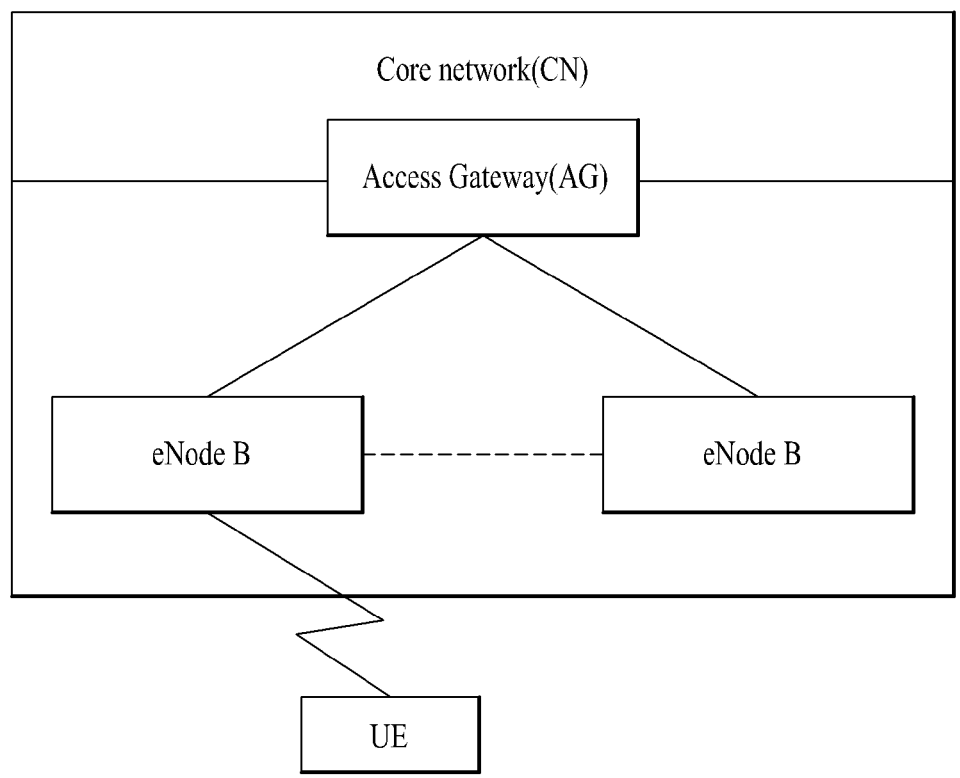
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a name of an eNode B can be used by a comprehensive terminology including an RRH (remote radio head), an eNB, a TP (transmission point), an RP (reception point), a relay and the like. The eNode B can also be called such a terminology as a node.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
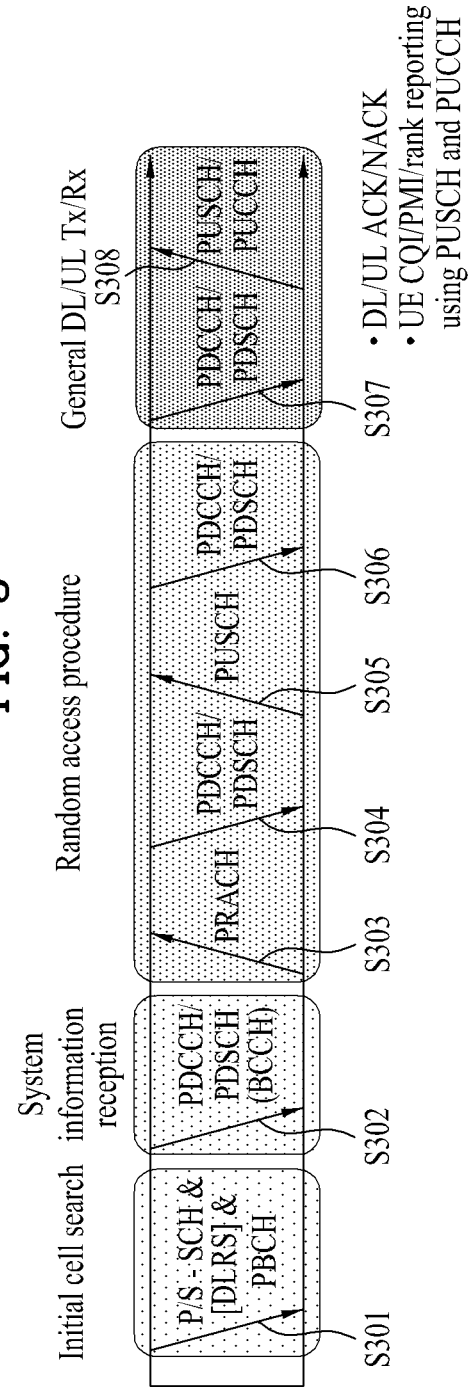
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
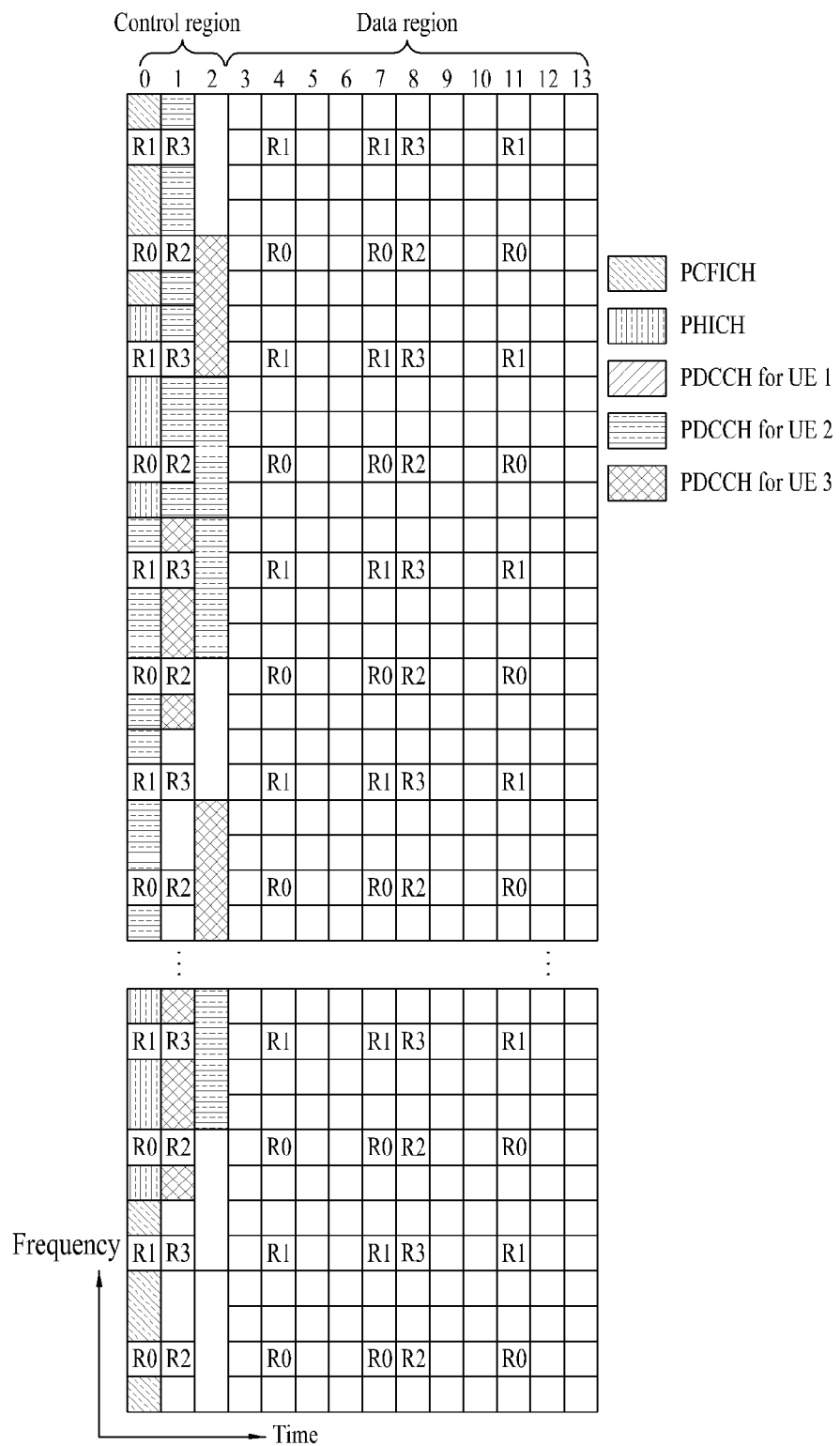
FIG. 4 is a diagram for a structure of a downlink radio frame in LTE system.

FIG. 4 is a diagram for showing an example of a control channel included in a control region of a single subframe in a DL radio frame.

Referring to FIG. 4, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 5:
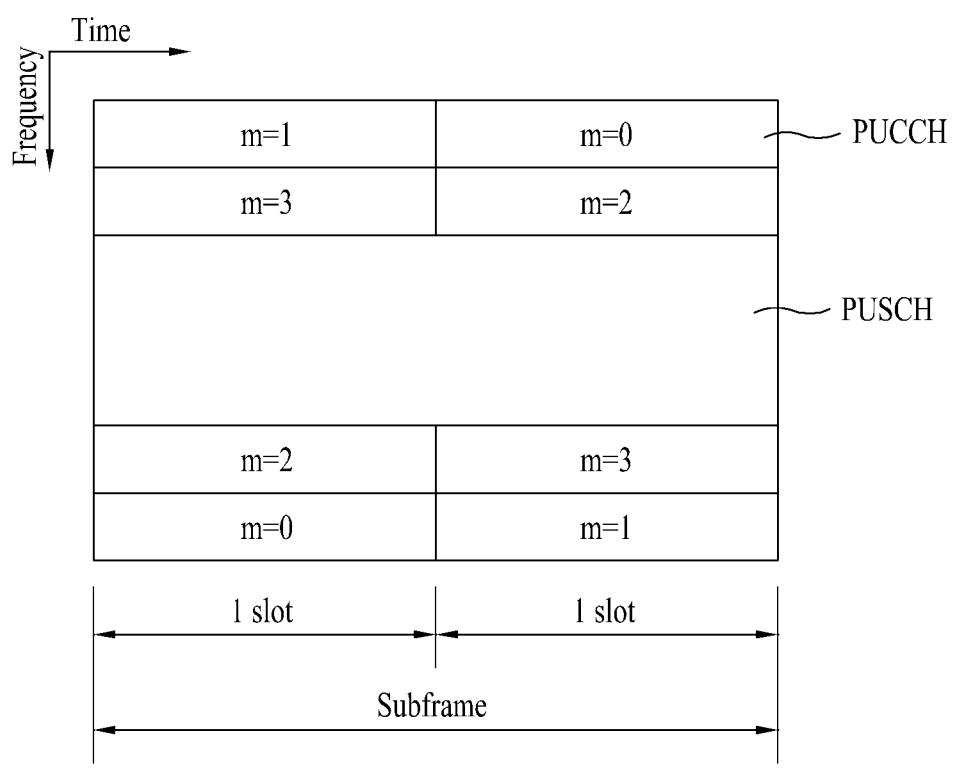
FIG. 5 is a diagram for a structure of an uplink radio frame in LTE system.

FIG. 5 is a diagram for a structure of an uplink subframe used in LTE system.

Referring to FIG. 5, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 5 shows an example that the PUCCHs satisfying conditions (e.g., m=0, 1, 2, 3) are assigned to a subframe.

Meanwhile, such an RS as an SRS (sounding reference signal) and a DM-RS (demodulation reference signal) is transmitted in the UL subframe. Since the RS is transmitted to an eNB in a manner of being specifically generated by a specific UE, the RS may be called an UL UE-specific RS.

The UL UE-specific RS is defined by a cyclic shift of a base sequence according to a prescribed rule. For instance, an RS sequence $r_{u,v}^{(\alpha)}(n)$ is defined by a cyclic shift α of a base sequence $\bar{r}_{u,v}(n)$ according to a following Formula 1.

$$r_{u,v}^{(\alpha)}(n) = e^{j\alpha n}\bar{r}_{u,v}(n), \ 0 \leq n < M_{sc}^{RS} \quad \text{[Formula 1]}$$

In this case, $M_{sc}^{RS} = mN_{sc}^{RB}$ corresponds to length of the RS sequence, where $1 \leq m \leq N_{RB}^{max,UL}$. $N_{RB}^{max,UL}$, which is represented by integer multiple of $N_{sc}^{RB}$, indicates a biggest UL bandwidth configuration. A plurality of RS sequences can be defined by a single base sequence via cyclic shift values α different from each other. A plurality of base sequences are defined for the DM-RS and the SRS.

For instance, the base sequences can be defined using a root Zadoff-Chu sequence. The base sequences $\bar{r}_{u,v}(n)$ are classified into groups. Each sequence group includes one or more base sequences. For instance, each base sequence group can include a single base sequence (v=0) where its length corresponds to $M_{sc}^{RS} = mN_{sc}^{RB}$, $1 \leq m \leq 5$. And, each base sequence group can include two base sequences where its length corresponds to $M_{sc}^{RS} = mN_{sc}^{RB}$, $6 \leq m \leq N_{RB}^{max,UL}$. In the base sequences $\bar{r}_{u,v}(n)$, u∈{0, 1, ..., 29} corresponds to a group number (i.e., a group index) and V indicates a base sequence number (i.e., a base sequence index) within a corresponding group. Each base sequence group number and the base sequence number within a corresponding group may change according to time.

A sequence group number U within a slot $n_s$ is defined by a group hopping pattern $f_{gh}(n_s)$ and a sequence shift pattern $f_{ss}$ according to Formula 2 in the following.

$$u = (f_{gh}(n_s) + f_{ss}) \bmod 30 \quad \text{[Formula 2]}$$

There exist a plurality (e.g., 17 group hopping patterns) of group hopping patterns different from each other and a plurality (e.g., 30 sequence shift patterns) of sequence shift patterns different from each other. A sequence group hopping can be enabled or disabled by a cell-specific parameter given by an upper layer.

A group hopping pattern $f_{gh}(n_s)$ can be given by Formula 3 in the following for PUSCH and PUCCH.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Formula 3]}$$

In this case, c(i) is a pseudo-random sequence and is initialized by $c_{init}$ according to Formula 4 in the following when each radio frame starts.

$$c_{init} = \left\lfloor \frac{n_{ID}^{RS}}{30} \right\rfloor \quad \text{[Formula 4]}$$

According to a current 3GPP LTE standard, PUCCH and PUSCH have an identical group hopping pattern according to Formula 3. Yet, PUCCH and PUSCH have sequence shift patterns different from each other, respectively. A sequence shift pattern $f_{ss}^{PUCCH}$ for PUCCH is given by Formula 5 in the following based on a cell ID.

$$f_{ss}^{PUCCH} = n_{ID}^{RS} \bmod 30 \quad \text{[Formula 5]}$$

A sequence shift pattern $f_{ss}^{PUSCH}$ for PUSCH is given by Formula 6 in the following using the sequence shift pattern $f_{ss}^{PUCCH}$ for PUCCH and a value ($\Delta_{ss}$) configured by an upper layer.

$$f_{ss}^{PUSCH} = (N_{ID}^{cell} + \Delta_{ss}) \bmod 30 \quad \text{[Formula 6]}$$

In this case, $\Delta_{ss} \in \{0, 1, \ldots, 29\}$.

And, a sequence shift pattern $f_{ss}^{SRS}$ for an SRS is given by Formula 7 in the following based on a cell ID.

$$f_{ss}^{SRS} = n_{ID}^{RS} \bmod 30 \quad \text{[Formula 7]}$$

Meanwhile, a sequence hopping is applied to RSs where its length corresponds to $M_{sc}^{RS} \geq 6N_{sc}^{RB}$ only. For RSs where its length corresponds to $M_{sc}^{RS} < 6N_{sc}^{RB}$, a base sequence number v within a base sequence group is given by V=0. For the RSs where its length corresponds to $M_{sc}^{RS} \geq 6N_{sc}^{RB}$, a base sequence number v within the base sequence group in a slot $n_s$ is given by Formula 8 in the following.

$$v = \begin{cases} c(n_s) & \text{if group hopping is disabled and} \\ & \text{sequence hopping is enabled} \\ 0 & \text{otherwise} \end{cases}$$ [Formula 8]

In this case, c(i) is initialized by $c_{init}$ according to Formula 9 in the following for a DM-RS on PUSCH when each radio frame starts. And, the c(i) is initialized by $c_{init}$ according to Formula 10 in the following for an SRS.

$$c_{init} = \left\lfloor \frac{n_{ID}^{RS}}{30} \right\rfloor \cdot 2^5 + f_{ss}^{PUSCH}$$ [Formula 9]

$$c_{init} = \left\lfloor \frac{n_{ID}^{RS}}{30} \right\rfloor \cdot 2^5 + (n_{ID}^{RS} + \Delta_{ss}) \bmod 30$$ [Formula 10]

A PUSCH DM-RS is transmitted according to a layer corresponding to a spatial resource. A PUSCH DM-RS sequence $r_{PUSCH}^{(\lambda)}(\cdot)$ related to a layer $\lambda \in \{0, 1, \ldots, v-1\}$ is given by Formula 11 in the following.

$$r_{PUSCH}^{(\lambda)}(m \cdot M_{sc}^{RS} + n) = w^{(\lambda)}(m) r_{u,v}^{(\alpha_\lambda)}(n)$$ [Formula 11]

m=0, 1 n=0, . . . , $M_{sc}^{RS}$−1

In this case, $M_{sc}^{RS} = M_{sc}^{PUSCH}$, $M_{sc}^{PUSCH}$ is a bandwidth scheduled for UL transmission and indicates the number of subcarriers. An orthogonal sequence $w^{(\lambda)}(m)$ can be given by Table 1 in the following using a cyclic shift field within a latest UL scheduling DCI used for a transport block related to corresponding PUSCH transmission. Table 1 shows an example of mapping of the cyclic shift field within the UL scheduling DCI format mapped to $n_{DMRS,\lambda}^{(\lambda)}$ and [$w^{(\lambda)}(0)$ $w^{(\lambda)}(1)$].

TABLE 1

| Cyclic Shift Field in uplink-related DCI format [3] | $n_{DMRS,\lambda}^{(2)}$ | | | | [$w^{(\lambda)}(0)$ $w^{(\lambda)}(1)$] | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

A cyclic shift $\alpha_\lambda$ in a slot $n_s$ is given by $\alpha_\lambda = 2\pi n_{cs,\lambda}/12$. In this case, $n_{cs,\lambda} = (n_{DMRS,\lambda}^{(1)} + n_{DMRS,\lambda}^{(2)} + n_{PN}(n_s)) \bmod 12$. $n_{DMRS}^{(1)}$ is given by Table 2 in the following according to a cyclic shift parameter, which is given by upper layer signaling. Table 2 shows a mapping between a cyclic shift (cyclicShift) given by the upper layer signaling and $n_{DMRS}^{(1)}$.

TABLE 2

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$n_{PN}(n_s)$ is given by Formula 12 in the following using a cell-specific pseudo-random sequence c(i).

$$n_{PN}(n_s) = \sum_{i=0}^{7} c(8N_{symb}^{UL} \cdot n_s + i) \cdot 2^i$$ [Formula 12]

In Formula 12, c(i) is initialized according to Formula 13 and Formula 14 in the following when each radio frame starts. In particular, in Formula 12, the c(i) initialized according to Formula 13 and Formula 14 in accordance with whether a value $N_{ID}^{csh\_DMRS}$ used for a cyclic shift hopping is configured.

$$c_{init} = \left\lfloor \frac{n_{ID}^{RS}}{30} \right\rfloor \cdot 2^5 + ((N_{ID}^{cell} + \Delta_{ss}) \bmod 30)$$ [Formula 13]

$$c_{init} = \left\lfloor \frac{n_{ID}^{csh\_DMRS}}{30} \right\rfloor \cdot 2^5 + (n_{ID}^{csh\_DMRS} \bmod 30)$$ [Formula 14]

Figure 6:
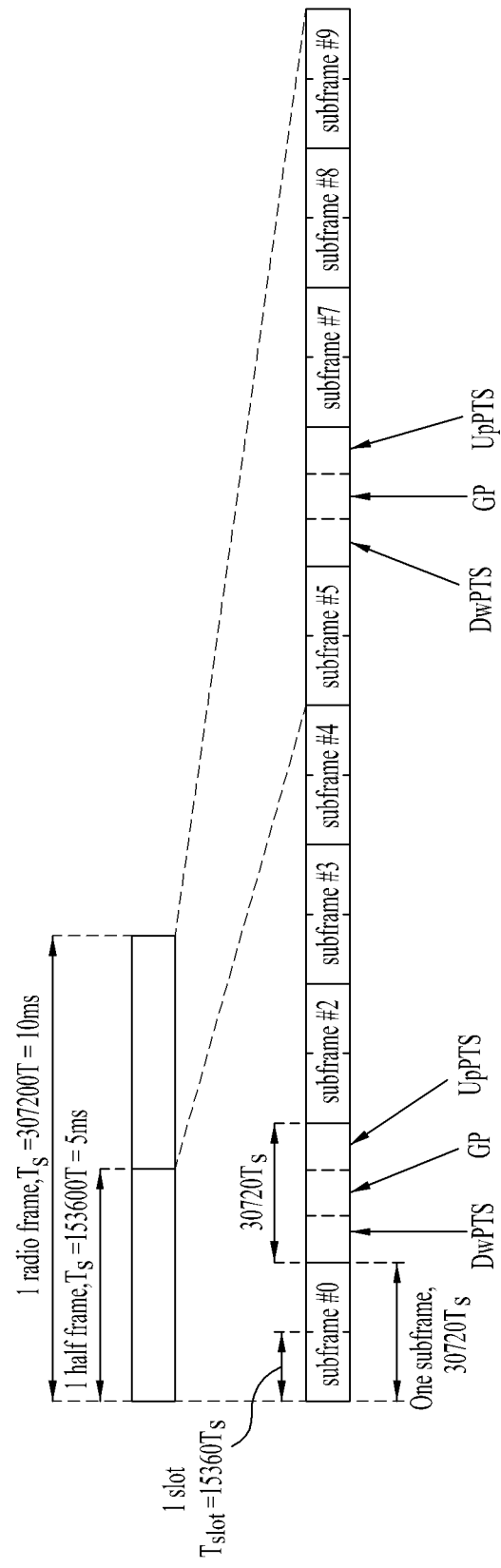
FIG. 6 is a diagram for an example of a structure of a radio frame in LTE TDD system.

FIG. 6 is a diagram for an example of a structure of a radio frame in LTE TDD system. In LTE TDD system, a radio frame includes two half frames. Each of the half frames includes 4 normal subframes including 2 slots, respectively and a special subframe including DwPTS (downlink pilot time slot), GP (guard period) and UpPTS (uplink pilot time slot).

In the special subframe, the DwPTS is used for initial cell search, synchronization or channel estimation in a user equipment. The UpPTS is used for channel estimation in a base station and uplink transmission synchronization of the user equipment. In particular, the DwPTS is used for DL transmission and the UpPTS is used for UL transmission. In particular, the UpPTS is utilized to transmit a PRACH preamble or an SRS. The guard period is a period for eliminating interference generated in uplink due to multipath delay of a downlink signal between uplink and downlink.

Regarding the special subframe, configuration of the special subframe is defined by a current 3GPP standard document as Table 3 in the following. Referring to Table 3, in case of $T_s = 1/(15000 \times 2048)$, it indicates the DwPTS and the UpPTS and a remaining region is configured as the guard period.

TABLE 3

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In the meantime, Table 4 in the following shows UL/DL configuration in LTE TDD system.

TABLE 4

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 4, 'D' indicates a DL subframe, 'U' indicates a UL subframe and 'S' indicates a special subframe. Table 4 also shows a DL-UL switching period in the UL/DL subframe configuration in each system.

As various devices requiring M2M (machine-to-machine) communication and high data transmission capacity are emerged and disseminated, data requisites for a cellular network are rapidly increasing in a current wireless communication environment. In order to satisfy high data requisite, communication technologies are developing to a carrier aggregation technology for efficiently using more frequency bands, a multi-antenna technology used for increasing data capacity in a limited frequency, a multi-base station cooperation technology, and the like and the communication environment is evolving in a manner that density of an accessible node is growing in the vicinity of a user. A system equipped with the node of high density may have higher system performance by means of cooperation between nodes. Compared to a node operating as an independent base station (a base station (BS), an advanced BS (ABS), a Node-B (NB), an eNode-B (eNB), an access point (AP), and the like) without cooperation, the aforementioned scheme may have superior performance.

Figure 7:
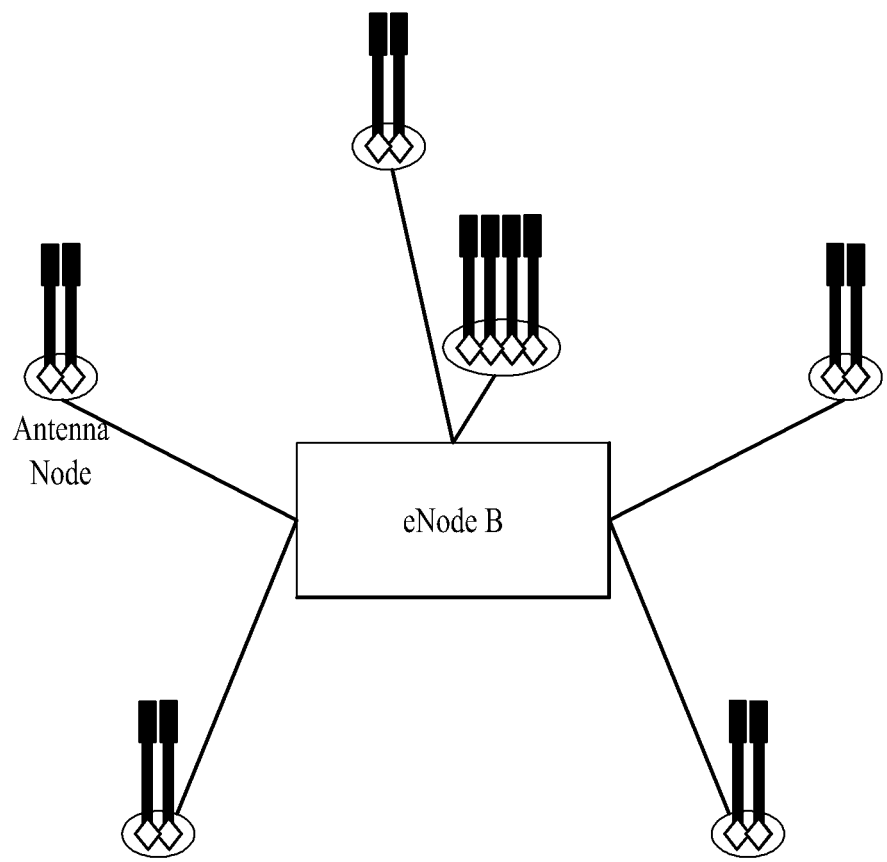
FIG. 7 is a diagram for an example of a multi node system in a next generation communication system

FIG. 7 is a diagram for an example of a multi node system in a next generation communication system.

Referring to FIG. 7, if an individual node operates as a part of antenna group of a cell in a manner that a controller manages transmission and reception of all nodes, it may correspond to a distributed multi node system (DMNS) that forms a single cell. In this case, each of the individual nodes may receive a separate node ID or may operate as a part of antenna within the cell without a separate Node ID. Yet, if nodes have a cell identifier (ID) different from each other, it may correspond to a multi-cell system. If a multi cell is configured by a duplicated form according to coverage, this is called a multi-tier network.

Meanwhile, a Node-B, an eNode-B, a PeNB, a HeNB, an RRH (remote radio head), a relay, a distributed antenna, and the like may become a node and at least one antenna is installed in a node. A node is also called a transmission point. In general, a node indicates an antenna group apart from each other more than a prescribed space, the present invention defines and applies a node as a random antenna group irrespective of a space.

With the help of the introduction of the aforementioned multi-node system and a relay node, application of various communication schemes is enabled and channel quality enhancement can be performed. Yet, in order to apply the aforementioned MIMO scheme and inter-cell cooperation communication scheme to a multi-node environment, an introduction of a new control channel is required. To this end, a control channel considered as the newly introduced control channel, which corresponds to an E-PDCCH (enhanced-PDCCH), is under discussion. This channel is determined to be assigned to a data region (hereinafter described as PDSCH region) instead of a legacy control region (hereinafter described as PDCCH region). Consequently, control information on a node can be transmitted according to each UE via the E-PDCCH. Hence, a problem of shortage of the legacy PDCCH region can be solved as well. For reference, the E-PDCCH is not provided to a legacy UE. Instead, an LTE-A UE can receive the E-PDCCH only.

Figure 8:
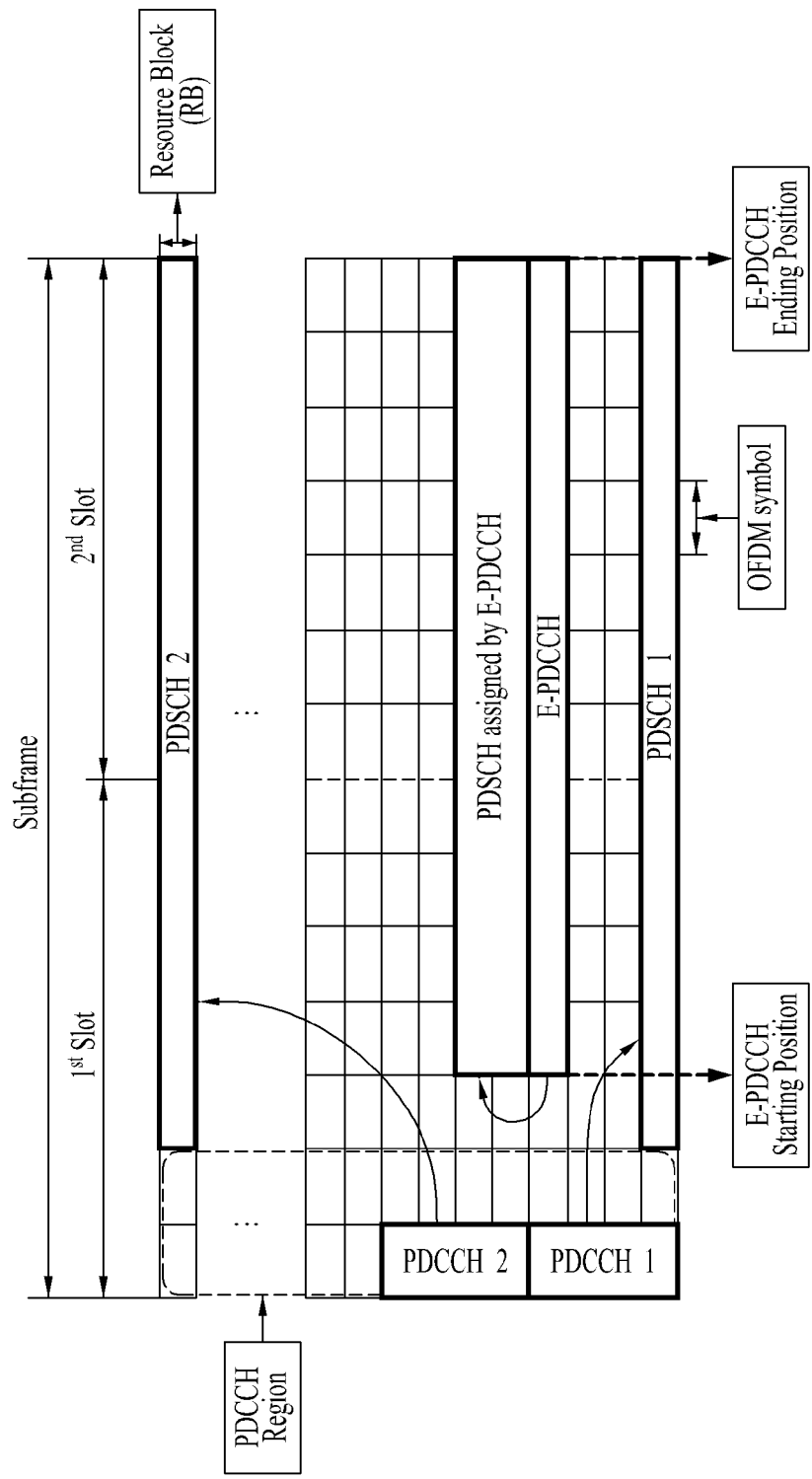
FIG. 8 is a diagram for an example of E-PDCCH explained in the present invention and PDSCH scheduled by the E-PDCCH.

FIG. 8 is a diagram for an example of E-PDCCH and PDSCH scheduled by the E-PDCCH.

Referring to FIG. 8, PDCCH 1 schedules PDSCH 1, PDCCH 2 schedules PDSCH 2 and E-PDCCH schedules a different PDSCH. In particular, FIG. 8 shows that the E-PDCCH is transmitted from a fourth symbol to the last symbol in a subframe.

In general, E-PDCCH can be used by defining a part of a PDSCH region carrying data and a user equipment should perform a process of blind decoding on a search space for E-PDCCH to detect whether there exist E-PDCCH of the user equipment. Although E-PDCCH performs a scheduling operation (i.e., PDSCH, PUSCH control) identical to a scheduling operation of a legacy PDCCH, if the number of user equipments, which have accessed such a node as an RRH, increases, greater number of E-PDCCHs are assigned to the inside of the PDSCH region. As a result, the number of blind decoding performed by the user equipment increases and complexity may be getting higher. And, legacy PDCCH is transmitted based on a CRS. On the contrary, E-PDCCH is transmitted based on a DM-RS corresponding to a UE-specific reference signal.

In the following description, a CoMP (coordinated multipoint) scheme is explained.

It is expected that a LTE-A system, which is a standard of a next generation mobile communication system, will support a CoMP (coordinated multi point) scheme, which is not supported by the conventional standard, to enhance a data transmission rate. In this case, the CoMP scheme is a transmission scheme for two or more base stations or cells to communicate with the user equipment in a manner of cooperating with each other to enhance a communication performance between the user equipment situated at a radio shadow zone and the base station (a cell or a sector).

The CoMP transmission scheme can be classified into a join processing (COMP joint processing, CoMP-JP) scheme in the form of a cooperative MIMO via data sharing and a coordinated scheduling/beamforming (CoMP-coordinated scheduling/beamforming, CoMP-CS/CB) scheme.

According to the joint processing (CoMP-JP) scheme in DL, a user equipment may be able to instantaneously receive data simultaneously from each of the base stations performing the CoMP transmission scheme. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission scheme (Dynamic Point Selection (DPS)). On the other hand, according to the coordinated scheduling/beamforming scheme (CoMP-CS/CB), the user equipment may be able to instantaneously receive data from a single base station, i.e., serving base station, via a beamforming.

According to the joint processing (COMP-JP) scheme in UL, each of the base stations may be able to simultaneously receive PUSCH signal from the user equipment (Joint Reception (JR)). On the other hand, according to the coordinated scheduling/beamforming scheme (COMP-CS/CB), only a single base station may be able to receive the PUSCH. In this case, the decision to use the coordinated scheduling/beamforming scheme is determined by the coordinating cells (or base stations).

In the following, a random access procedure defined by LTE system is explained. In LTE system, the random access procedure is classified into a contention based random access procedure and a non-contention based random access procedure. Each of the random access procedures is explained in more detail with reference to the attached drawings.

Figure 9:
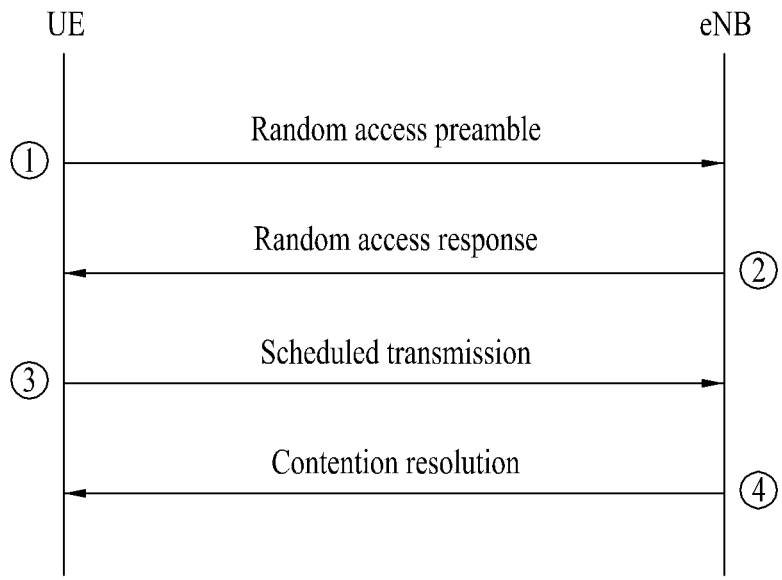
FIG. 9 is a diagram of an operating process between a user equipment (UE) and an eNode B (eNB) in a contention based random access procedure provided by LTE system.

FIG. 9 is a diagram of an operating process between a user equipment (UE) and an eNode B (eNB) in a contention based random access procedure provided by LTE system.

In a contention based random access procedure, a user equipment randomly selects a random access preamble from a set of random access preambles indicated by system information or a handover command, selects a PRACH resource capable of carrying the random access preamble, and then transmits the selected random access preamble to eNode B [step 1].

Having transmitted the random access preamble, the user equipment attempts a reception of its random access response in a random access response receiving window indicated by the eNode B through the system information or the handover command [step 2].

Specifically, random access information is transmitted in form of MAC PDU and the MAC PDU may be delivered on PDSCH. And, in order for the user equipment to properly receive the information delivered on the PDSCH, PDCCH is also delivered together. In particular, information on the user equipment necessary to receive the PDSCH, a frequency and time information of radio resources of the PDSCH, a transmission format of the PDSCH and the like are included in the PDCCH. In this case, once the user equipment succeeds in the reception of the PDCCH transmitted to the user equipment, it may be able to appropriately receive a random access response carried on the PDSCH in accordance with the informations of the PDCCH. The random access response may include a random access preamble identifier, a UL grant, a temporary C-RNTI, a TAC (time alignment command) and the like. The random access preamble identifier may be identical to the random access preamble selected by the user equipment in the step 1.

If the user equipment receives a random access response valid for the user equipment, the user equipment may separately process the informations included in the random access response. In particular, the user equipment saves the temporary C-RNTI. Moreover, the user equipment transmits a data stored in a buffer of the user equipment or a newly created data to the eNode B using the UL grant [step 3].

In the contention based random access procedure, since the eNode B is unable to determine which user equipments perform the random access procedure and should identify a user equipment to resolve a future contention, a UE identifier should be included in data, which is included in the UL grant.

In this case, in order to include the UE identifier, two different schemes can be provided. First of all, according to a first scheme, if the user equipment has a valid cell identifier already assigned by a corresponding cell prior to the random access procedure, the user equipment transmits its cell identifier via the UL grant. On the contrary, according to a second scheme, if the user equipment fails to receive the assignment of a valid cell identifier prior to the random access procedure, the user equipment transmits its unique identifier. In general, the unique identifier is longer than the cell identifier. If the user equipment transmits data via the UL grant, the user equipment initiates a contention resolution timer.

After the user equipment has transmitted the data and the identifier via the UL grant included in the random access response, the user equipment waits for an indication of the eNode B for the contention resolution. In particular, the user equipment attempts a reception of PDCCH to receive a specific message [step 4].

In this case, there exist two kinds of schemes used for receiving the PDCCH. As mentioned in the foregoing description, if the UE identifier transmitted via the UL grant corresponds to the cell identifier, the user equipment attempts a reception of the PDCCH using the cell identifier of the user equipment. If the UE identifier transmitted via the UL grant corresponds to the unique identifier of the user equipment, the user equipment attempts the reception of the PDCCH using the temporary C-RNTI included in the random access response.

Thereafter, in the former case, if the user equipment receives the PDCCH via the cell identifier of the user equipment before the contention resolution timer elapses, the user equipment determines that the random access procedure has been successfully performed and then ends the random access procedure.

In the latter case, if the PDCCH is received via a temporary C-RNTI before the contention resolution timer elapses, the user equipment checks data delivered on PDSCH indicated by the PDCCH. If the unique identifier of the user equipment is included in content of the data, the user equipment determines that the random access procedure has been successfully performed and then ends the random access procedure.

Figure 10:
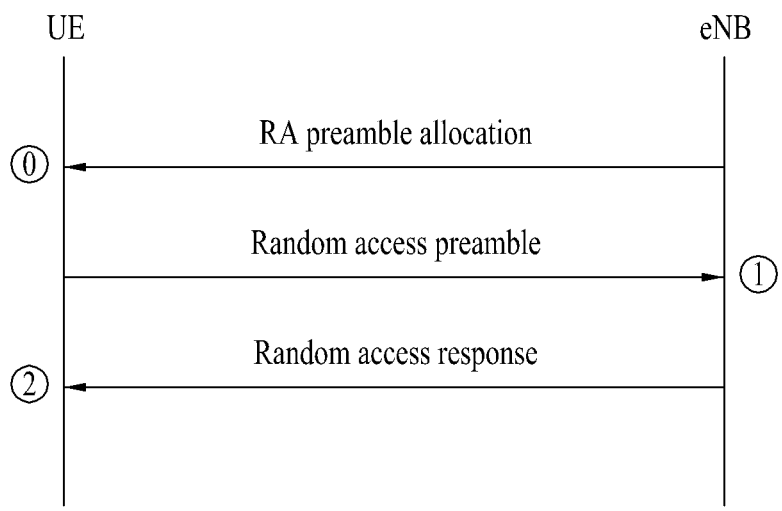
FIG. 10 is a diagram of an operating process between a user equipment (UE) and an eNode B (eNB) in a non-contention based random access procedure provided by LTE system.

FIG. 10 is a diagram of an operating process between a user equipment (UE) and an eNode B (eNB) in a non-contention based random access procedure provided by LTE system. When the non-contention based random access procedure is compared with the contention based random access procedure, if random access response information is received in response to transmission of a pre-allocated random access preamble, it is determined that the non-contention based random access procedure is successfully performed and then the random access procedure ends.

In general, the non-contention based random access procedure is performed by two cases in the following. One is a handover procedure and another is a request of a command of an eNode B. Of course, the contention based random access procedure is also performed by the aforementioned two cases. First of all, it is important to receive a dedicated random access preamble including no possibility of contention from the eNode B to perform the non-contention based random access procedure. In this case, a handover command and a PDCCH command can be performed to allocate a random access preamble. Subsequently, if a UE-dedicated random access preamble is allocated from the eNode B, the user equipment transmits a preamble to the eNode B. Subsequently, a method of receiving random access information is identical to a method of receiving the random access information of the contention based random access procedure.

The non-contention based random access procedure is started when the eNode B indicates the user equipment to start the non-contention based random access procedure. In this case, the eNode B selects a specific preamble to be used during the random access procedure and directly notifies the user equipment of the selected preamble. For instance, if the eNode B notifies the user equipment to use a random access preamble ID 4 (i.e., RADIP=4), the user equipment can perform the non-contention based random access procedure using a unique preamble corresponding to the RAPID=4.

According to the present invention, when a random access procedure is performed, the present invention proposes a scheme that transmission/reception characteristic of a specific message(s) is applied in a manner of being different from transmission/reception characteristic of a different message(s).

To this end, information on the transmission/reception characteristic of a following message(s) can be transmitted together with a preceding message(s) or in a manner of being included in the preceding message(s). For instance, the information on the transmission/reception characteristic of the following message(s) can include at least one of informations listed in Table 5 in the following.

TABLE 5

Transmission/reception cell information of following message(s) → (physical/virtual) cell ID
Search space (SS) configuration information of a control channel required for transmitting/receiving following message(s)→ E-PDCCH (or PDCCH) based common search space or UE-specific search space configuration information
Type of control channel on which following message(s) is defined in advance → information on a control channel among a legacy PDCCH and E-PDCCH on which decoding is based
In case that following message(s) is transmitted/received based on PDCCH or E-PDCCH, RS configuration information used for PDCCH or E-PDCCH → antenna port index, scrambling sequence parameter and the like
Interference mitigation technique used for transmitting/receiving following message(s) → information on transmitter side rate matching technique, receiver side puncturing technique, receiver side interference cancellation technique or the like
UL/DL subframe configuration information necessary for transmitting/receiving following message(s)

In particular, in Table 5, the UL/DL subframe configuration information in TDD system can include not only information on UL/DL subframe configuration index, interval, subframe offset of UL/DL subframes and the like but also additional informations configured to efficiently transmit/receive following message(s) or perform a multiplexing operation. For instance, in order to efficiently perform a multiplexing operation for an RS (or RS sequence), which is used for transmitting/receiving following message(s), such information as a virtual cell ID, an antenna port index of DL/UL RS, the number of antenna port of DL/UL RS, a scrambling sequence parameter, information on a transmission mode (e.g., transmit diversity mode, beamforming mode, single port transmission mode or the like), information used for matching a group hopping pattern of an UL RS, a sequence hopping pattern, a cyclic shift hopping pattern or the like, information used for matching whether to apply group hopping of UL RS, sequence hopping, or cyclic shift hopping, or the like, and the like can be included in the UL/DL subframe configuration information in TDD system.

Information on the aforementioned interference mitigation technique applied to the transmission/reception of the following message(s) can inform a user equipment of a method of reducing impact of interference from a neighboring cell for a specific RS (e.g., CRS, CSI-RS). For instance, an eNode B can inform a user equipment of information on an interference mitigation technique (e.g., transmitting side rate matching technique, receiving side puncturing technique, receiving side interference cancellation technique or the like) applied to each of a plurality of RSs via predetermined signaling (e.g., upper layer signaling or physical layer signaling). In particular, the information on the interference mitigation technique can inform that the transmitting side rate matching technique is applied to a CRS interfered by the neighboring cell. And, the information can also inform that no interference mitigation technique, the receiving side puncturing technique or the receiving side interference cancellation technique is applied to the CSI-RS. Moreover, the information on the interference mitigation technique can also inform the UE of information on specific resource regions to which the interference mitigation technique is applied. For instance, the information on the interference mitigation technique can inform the UE of information used for selecting a specific resource region candidate from a predetermined plurality of resource region candidates or bit-map information used for indicating resource regions to which the interference mitigation technique is applied among resource regions on system bandwidth. Moreover, as information on the interference mitigation technique applied to the transmission/reception of the following message(s), it is able to inform the UE of information on interference coming from a specific RS transmitted by the neighboring cell, for instance, information on the number of antenna port of a corresponding RS, an index and the like. By doing so, it is able to make the UE efficiently apply a predetermined specific interference mitigation technique based on the above-mentioned information.

And, search space configuration information of a control channel used for transmitting/receiving of the aforementioned following message(s) can be implemented in a form described in the following.

1) A plurality of resource region (or location) candidates capable of being designated as a common search space (or UE-specific search space) are defined in advance and it is able to inform of information on a common search space (or UE-specific search space) allocated to the UE by transmitting an indicator or a bit-map indicating a specific resource region candidate. In this case, information on a plurality of the resource region (or location) candidates capable of being designated as the common search space (or UE-specific search space) can be shared between eNB and the UE in advance.

2) It may be assumed that a common search space (or UE-specific search space) on a predetermined fixed resource region is always used only. In the same manner, information on the common search space (or UE-specific search space) on the fixed resource region can be shared between the eNB and the UE in advance.

3) Information on a resource region used as a common search space (or UE-specific search space) can be implemented by a combination form of staring point information on the resource region and size (or length) information on the resource region.

4) It is able to simultaneously inform such information as antenna port information to be used for transmitting/receiving following message(s), scrambling sequence parameter information, transmission mode information (e.g., transmit diversity mode, beamforming mode, or single antenna port transmission mode) or the like.

5) A plurality of resource region (or location) candidates capable of being designated as a common search space (or UE-specific search space) are interlocked with specific RS (e.g., CSI-RS or DM-RS) configuration information in advance and a UE is able to aware of information on a resource region candidate selected as the common search space (or UE-specific search space) based on identifier information (e.g., physical or virtual cell ID) of a target eNB(s) of a following message(s) or RS configuration information of the target eNB(s) received from the eNB. Of course, information on the resource region (or location) designated as the common search space (or UE-specific search space), which is interlocked with the specific RS configuration information, can be shared between the eNB and the UE in advance.

And, the RS configuration information used for the PDCCH and the E-PDCCH indicates RS configuration information used for decoding a CSS or a USS of the PDCCH or the E-PDCCH. The RS configuration information can include not only an antenna port index and a scrambling sequence parameter but also information on the number of antenna port.

If a preceding message(s) does not include information on transmission/reception characteristic of a following message(s), the UE can process the following message(s) based on a transmission/reception scheme defined as a default mode (or fallback mode) in advance.

Moreover, according to the present invention, if messages exchanged with each other between the UE and the eNB in a random access procedure are transmitted and received based on a plurality of control channels (e.g., legacy PDCCH and E-PDCCH), offload effect of a control channel can be brought.

According to the present invention, in case that a carrier aggregation (CA) technique is applied, transmission/reception of a following message(s) can be configured to operate based on a cell (e.g., secondary cell (S-cell)) different from a cell (e.g., a primary cell (P-cell)) used for transmitting/receiving a preceding message(s), an extension carrier or a NCT (new carrier type) currently discussing.

For reference, the NCT corresponds to a carrier to which E-PDCCH is transmitted only instead of s legacy PDCCH. Different control channels, which were capable of being transmitted in a legacy downlink subframe, may not be transmitted. In this case, when the NCT is applied, it is able to assume a case that a cell transmitting and receiving a preceding message corresponds to a legacy carrier and a cell transmitting and receiving a following message corresponds to the NCT. In this case, the information on the transmission/reception characteristic of the following message can be transmitted together with preceding message or in a manner of being included in the preceding message.

And, as described in the present invention, if a following message(s) is delivered to a UE based on a control channel different from a control channel of a preceding message(s), the UE implicitly considers that reception of SIB information or a PBCH channel (or paging information) including MIB information is performed based on a (common or UE-specific) search space used for decoding the following message(s). Or, the preceding message(s) may inform the UE of information indicating application of the aforementioned operation. For instance, if the eNB informs the UE that a legacy PDCCH based transmission/reception operation is applied to the preceding message and the following message is transmitted/received based on the E-PDCCH, the UE can receive a PBCH channel after a corresponding timing or SIB information (or paging information) based on the E-PDCCH.

And, if the E-PDCCH is delivered based on a different specific RS (e.g., a DM-RS or a CSI-RS) instead of an RS (e.g., a CRS), which was used to receive the legacy PDCCH, the SIB information or the PBCH (i.e., MIB information) channel (or paging information) can be configured to be received based on an RS used for decoding the E-PDCCH. The SIB information or the PBCH channel (i.e., MIB information) (or paging information) received based on the above-mentioned operation can be newly defined as E-SIB (enhanced-SIB) information and E-PBCH (enhanced PBCH) channel (i.e., E-MIB (enhanced-MIB) information) (or E-paging (enhanced paging) information), respectively. The eNB can inform the UE of RS configuration information, which is used for a transmission/reception operation of the E-SIB information or the E-PBCH channel (i.e., the E-MIB information) (or the E-paging information), resource (region) configuration information, a type of an interference mitigation technique applied to a corresponding channel (or information), a method of applying the interference mitigation technique and the like, via the legacy SIB information, the PBCH channel (i.e., the MIB information) (or paging information) or the preceding message(s) (e.g., preceding message(s) to which information making following message(s) to be received via E-PDCCH based decoding is transmitted).

In addition, a UE performing a random access procedure, in particular, a contention based random access procedure may transmit L2/L3 message (i.e., message #3) transmitted by the UE again due to many reasons. In this case, the reasons may include a poor UL channel state, L2/L3 message conflict occurring when the UEs, which have transmitted random access preamble messages via an identical time/frequency resource domain, receive a same random access response message (i.e., a message #2) and transmit the L2/L3 message (at the same time) again based on the same random access response message, or the like.

In the aforementioned situation, legacy UEs obtains scheduling information (e.g., UL grant or PHICH) indicating whether a message is transmitted again in a UE-specific search space of PDCCH (or common search space) via a temporary C-RNTI or C-RNTI based blind decoding.

Yet, for offload of a control channel, information on whether L2/L3 message is transmitted again (or information related to retransmission of L2/L3 message) can be transmitted/received by methods in the following a) to d) in the present invention. For instance, an eNB can inform a UE of the information on whether the L2/L3 message is transmitted again together with such a specific message preceding to the L2/L3 message as a first random access response message. Or, the eNB can inform the UE of the information on whether the L2/L3 message is transmitted again in a manner of including the information in the first random access response message. And, if the information on whether the L2/L3 message is transmitted again is not included in the specific message, the UE can receive related information via a default mode (or fallback mode) control channel (e.g., legacy PDCCH) to which the (scheduling) information on whether the L2/L3 message is transmitted again is transmitted.

a) Aside from a control channel used for receiving a random access response message (i.e., a message #2) or a contention resolution message (i.e., a message #4), in order to receive information on retransmission of the L2/L3 message via a legacy PDCCH or a UE-specific search space (or a common search space) of E-PDCCH, a prescribed indicator (or information corresponding to the indicator) can be included in a preceding message(s) (e.g., a first random access response message) of the L2/L3 message or a rule can be determined in advance to indicate the information.

b) In order to receive the information on retransmission of the L2/L3 message in a UE-specific search space (or common search space) of a control channel identical to a control channel used for receiving a random access response message, a prescribed indicator (or information corresponding to the indicator) can be included in a preceding message(s) (e.g., a first random access response message) of the L2/L3 message or a rule can be determined in advance to indicate the information.

c) In order to receive the information on retransmission of the L2/L3 message in a UE-specific search space (or common search space) of a control channel identical to a control channel, which is configured to receive a following contention resolution message, a prescribed indicator (or information corresponding to the indicator) can be included in a preceding message(s) (e.g., a first random access response message) of the L2/L3 message or a rule can be determined in advance to indicate the information.

d) As a different scheme, if the retransmission of the L2/L3 message is performed based on a legacy PHICH or E-PHICH (enhanced PHICH) transmitted to a UE by an eNB in the aforementioned proposed scheme, the eNB can inform the UE of information used for efficiently supporting the retransmission operation together with a preceding message(s) (e.g., a first random access response message) of the L2/L3 message. Or, the eNB can inform the UE of the information supporting the retransmission operation in a manner of including the information in the preceding message(s). Or, a rule can be determined in advance to indicate the information.

In particular, information on channel information used for the operation of retransmitting the L2/L3 message (i.e., a message #3) among PHICH and E-PHICH can be informed. In this case, a prescribed indicator (or information corresponding to the indicator) indicating the channel information used for retransmitting the L2/L3 message can be informed together with a preceding message(s) (e.g., a first random access response message) of the L2/L3 message. Or, the prescribed indicator can be informed in a manner of being included in the preceding message(s) of the L2/L3 message. Or, a rule can be determined in advance to indicate the information.

In particular, in case that the operation of retransmitting the L2/L3 message is configured to be performed based on the E-PDCCH, the eNB can inform the UE of the prescribed indicator (or the information corresponding to the indicator) together with i) information on resource region configuration used for E-PHICH information mapping (or E-PHICH transmission), ii) RS configuration information used for an operation of transmitting/receiving the E-PHICH, iii) a type of an interference mitigation technique applied to E-PHICH transmission/reception and a method of applying the interference mitigation technique and iv) information on a cell in which the E-PHICH is transmitted and received (e.g., a physical or virtual cell ID) and the like.

Of course, if the aforementioned information is not included in the preceding message(s) (or, specific message(s)), a rule can be configured to make the UE perform the operation of retransmitting the L2/L3 message based on a PHICH channel defined as a default mode or a fallback mode in advance, i.e., legacy PHICH information.

In addition, it is able to make the L2/L3 message corresponding to a following message to be transmitted/received based on communication configuration information, which is used for an operation of transmitting/receiving a random access response message corresponding to a preceding message. For instance, if it is assumed that the random access response message corresponding to the preceding message(s) is transmitted/received based on E-PDCCH of a specific node (or a communication point), it is able to make the L2/L3 message to be implicitly transmitted based on a virtual cell ID (or a physical cell ID) of a node identical to the node used for transmitting/receiving the random access response message. Or, if the L2/L3 message is transmitted based on the node identical (or different) to/from the node used for transmitting/receiving the random access response message, cyclic shift-related configuration of the L2/L3 message preferentially defines a cyclic shift value interlocked with an antenna port index (or the number of antenna port) used for transmitting/receiving the random access response message or a cyclic shift value interlocked with an antenna port index (or the number of antenna port) used for detecting DCI on which an RA-RNTI is masked. And, the L2/L3 message can be transmitted in a manner of applying a cyclic shift value selected based on the aforementioned information. In case that the L2/L3 message is transmitted based on a node identical or different to/from a node used for transmitting/receiving the random access response message, the aforementioned scheme can also be used for implicitly determining a scrambling sequence applied to the L2/L3 message, transmission mode information, group hopping pattern information, information on whether the group hopping is applied, information on whether sequence hopping is applied or information on whether cyclic shift hopping is applied. The eNB can inform the UE of the communication configuration information via E-SIB information, E-PBCH (i.e., E-MIB information) or E-paging information in advance. Or, the eNB informs the UE of the communication configuration information together with a preceding message(s) (e.g., a first random access response message). Or, the communication configuration information can be informed in a manner of being included in the preceding message(s).

Moreover, in the present invention, RS configuration, which is used for the operation of transmitting/receiving a random access response message, can be configured to be changed according to a characteristic (or subframe type) of a subframe to which the random access response message is transmitted. For instance, if the subframe to which the random access response message is transmitted corresponds to an MBSFN subframe, random access response message decoding is performed based on a DM-RS. On the contrary, if the subframe to which the random access response message is transmitted corresponds to a normal subframe or a non-MBSFN subframe, the random access response message decoding is performed based on a CRS. To this end, a prescribed indicator (or information) can be informed via (E-)SIB information or (E-)PBCH channel (i.e., (E-)MIB information) (or (E-)paging information). Or, the prescribed indicator can be determined in advance. Of course, if a UE does not receive the aforementioned prescribed indicator (or information), it is able to make a rule of making the UE perform an operation of transmitting/receiving a random access response message (i.e., a message #2) based on a basically defined specific RS (e.g., a CRS or a DM-RS) in advance.

Figure 11:
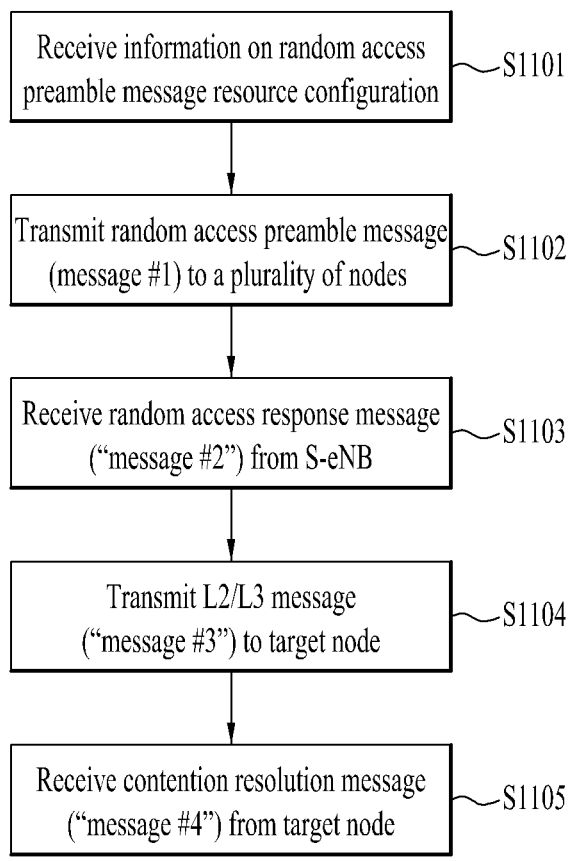
FIG. 11 is a flowchart for an example of a random access procedure according to embodiment of the present invention.

FIG. 11 is a flowchart for an example of a random access procedure according to embodiment of the present invention. In particular, FIG. 11 assumes a case that a CoMP aggregation, i.e., all nodes participating in a CoMP operation have an identical physical cell ID as a CoMP situation in which a plurality of nodes are performing a cooperative communication.

Referring to FIG. 11, in the step S1101, a UE receives MIB information transmitted from a specific cell (via PBCH) using an initial cell access procedure identical to that of a legacy LTE system and receives SIB information. In this case, the UE can obtain information on random access preamble message resource configuration by decoding on the SIB information (e.g., SIB-2 information).

And, in the step S1102, the UE transmits a random access preamble message (a message #1) based on the random access preamble message resource configuration. In this case, the random access preamble message transmitted by the UE can be received by a plurality of nodes at the same time.

Subsequently, in the step S1103, the UE receives a random access response message (a message #2) from an S-eNB of the UE in response to the random access preamble message. In this case, the random access response message includes scheduling information (or PUSCH resource allocation information) on a L2/L3 message (i.e., a message #3), which is transmitted via a PUSCH region later by the UE.

In particular, according to the present invention, after a UE random access response message, the S-eNB can inform the UE of information on transmission/reception characteristic of a following message(s) together with the random access response message or in a manner of including the information on transmission/reception characteristic of the following message(s) in a UE random access response message. In this case, the following message(s) may correspond to the L2/L3 message or a contention resolution message (i.e., the message #4) for example.

If the following message corresponds to the L2/L3 message, in order for the UE to transmit the L2/L3 message to a specific node as a target node, the S-eNB can transmit information on the target node together with the random access response message (or in a manner of including the information on the target node in the random access response message). For instance, the information on the target node may correspond to information configured for the target node to efficiently perform an UL data multiplexing operation "between UEs performing such communication of a predetermined specific type as UL CoMP" or "between the UEs performing the communication of the predetermined specific type and UEs performing communication of a different type (e.g., non-CoMP).

And, the S-eNB receive information from the target node via such a predetermined specific channel as an X2 interface and the like and may be then able to inform the UE of the information. And, a part or all information listed in Table 6, which correspond to a UE-specific attribute or a UE group-specific attribute, can be transmitted to the UE via the S-eNB according to operation characteristic of the target node.

TABLE 6

Virtual cell ID

Information used for matching an RS group hopping pattern between multiplexed UEs
(For instance, information on $\Delta_{ss} \in \{0, 1, \ldots, 29\}$ in Formula 2 and Formula 6 related
to a sequence shift pattern)
Whether group hopping is applied for multiplexing operation between UEs, whether
sequence hopping is applied or whether cyclic shift hopping is applied
Cyclic shift/OCC index received from target node via X2 interface In particular, in case of a cyclic shift/OCC index, the S-eNB can dynamically receive the information from the target node or update the information. Or, the S-eNB can receive or update the information with a scheme (e.g., static signaling or semi-static signaling) of a relatively long interval. And, the S-eNB and the UE can consistently use a legacy value until the cyclic shift/OCC index is updated.

And, if the following message corresponds to a contention resolution message, the S-eNB can transmit information on the target node together with the random access response message or in a manner of including the information on the target node in the random access response message to receive the contention resolution message from a specific node.

For instance, in a situation that "the target node supports both PDCCH based communication and E-PDCCH based communication" or "the target node supports the E-PDCCH based communication only", the S-eNB can inform the UE of additional information to make the UE receive an E-PDCCH based contention resolution message from the target node. In particular, in order for the UE to receive the contention resolution message from the target node, the UE should know information on a common search space (or a UE-specific search space) configuration of the target node. The S-eNB receives the information from the target node via such a specific channel as an X2 interface and may be then able to inform the UE of the information. In addition, the S-eNB receives RS configuration information of E-PDCCH (antenna port index, the number of antenna port, a scrambling sequence parameter, transmission mode information and the like) from the target node via such a specific channel as the X2 interface and may be then able to inform the UE of the RS configuration information as well.

Subsequently, in the step S1104, the UE transmits the L2/L3 message (message #3) to a specific target node based on the information on the transmission/reception characteristic of the following message(s) received from the S-eNB.

Lastly, in the step S1105, the UE can receive the contention resolution message (message #4) from the S-eNB based on the information on the transmission/reception characteristic of the following message(s) via a designated control information channel (e.g., the common search space of E-PDCCH or the UE-specific search space of E-PDCCH) of the target node.

In addition, if the information on the transmission/reception characteristic of the following message(s) is not included in the preceding random access response message, the UE can transmit/receive the following message(s) (e.g., the L2/L3 message or the contention resolution message) based on the transmission/reception scheme defined by a default mode.

The present invention can be extensively applied to environment in which the nodes belonging to the CoMP aggregation have physical cell identifiers different from each other. And, the present invention can also be applied to not only a case of transmitting a random access preamble message for the use of an initial access but also a case that the random access preamble message is triggered in a situation that UL synchronization is already obtained, for instance, a case that transmission of the random access preamble message is triggered via PDCCH. And, the present invention can be extensively applied to both a case of performing a non-contention based random access procedure and a case of performing a contention based random access procedure.

The present invention can also be extensively applied to a case of performing a random access procedure on a communication between a UE and a (macro) eNB, a communication between the UE and a relay node, a communication between the (macro) eNB and the relay node or a communication between UEs (device-to-device communication). And, the proposed methods (or embodiments) of the present invention can be independently implemented or can be implemented in a (partly) combined form.

Figure 12:
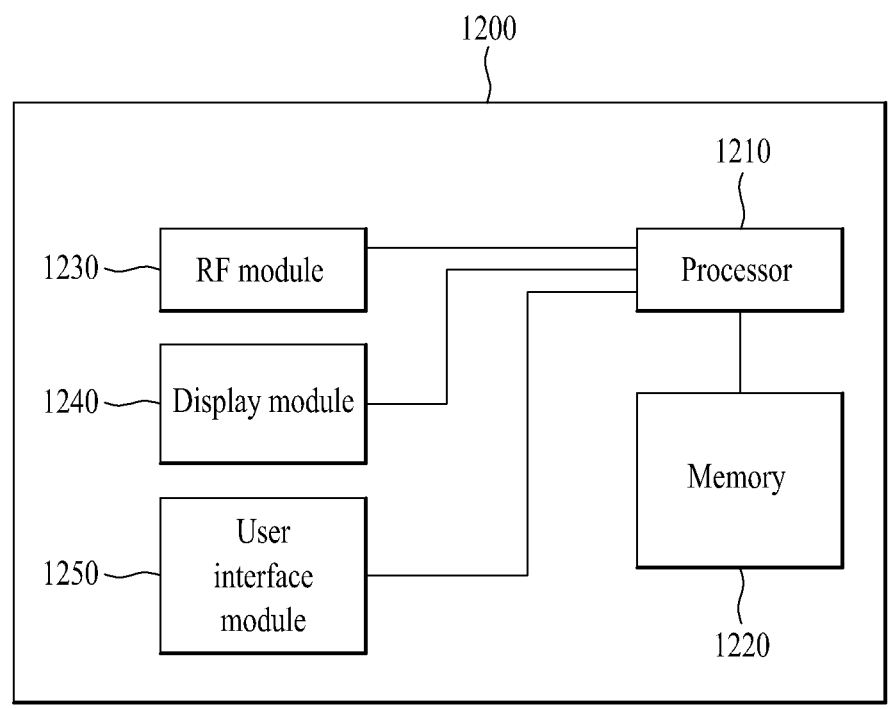
FIG. 12 is a block diagram for an example of a communication device according to one embodiment of the present invention.

Moreover, the present invention can be extensively applied to all environments in which interference from a neighboring cell exist. The present invention can also be extensively applied to a case that there exist interference under environment to which a carrier aggregation technique is applied, for instance, a case that a specific cell and a neighboring cell simultaneously use a component carrier of an identical band or a case that there exist interference between component carriers on an intra-band. FIG. 12 is a block diagram for an example of a communication device according to one embodiment of the present invention.

Referring to FIG. 12, a communication device 1200 may include a processor 1210, a memory 1220, an RF module 1230, a display module 1240, and a user interface module 1250.

Since the communication device 1200 is depicted for clarity of description, prescribed module(s) may be omitted in part. The communication device 1200 may further include necessary module(s). And, a prescribed module of the communication device 1200 may be divided into subdivided modules. A processor 1210 is configured to perform an operation according to the embodiments of the present invention illustrated with reference to drawings. In particular, the detailed operation of the processor 1210 may refer to the former contents described with reference to FIG. I to FIG. 11.

The memory 1220 is connected with the processor 1210 and stores an operating system, applications, program codes, data, and the like. The RF module 1230 is connected with the processor 1210 and then performs a function of converting a baseband signal to a radio signal or a function of converting a radio signal to a baseband signal. To this end, the RF module 1230 performs an analog conversion, amplification, a filtering, and a frequency up conversion, or performs processes inverse to the former processes. The display module 1240 is connected with the processor 1210 and displays various kinds of information. And, the display module 1240 can be implemented using such a well-known component as an LCD (liquid crystal display), an LED (light emitting diode), an OLED (organic light emitting diode) display and the like, by which the present invention may be non-limited. The user interface module 1250 is connected with the processor 1210 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of performing a random access procedure in a wireless communication system and an apparatus therefor are described with reference to examples applied to 3GPP LTE system, it may be applicable to various kinds of wireless communication systems as well as the 3GPP LTE system.

What is claimed is:

1. A method of a user equipment performing a random access procedure in a wireless communication system, the method comprising:

transmitting a random access preamble to at least one of a plurality of nodes including a serving cell;
receiving a random access response message from the serving cell;
transmitting an uplink signal to a different node excluding the serving cell among the plurality of nodes; and
receiving a contention resolution message from the different node,
wherein the random access response message comprises information indicating transmitting the uplink signal to the different node, information indicating receiving the contention resolution message from the different node and information on a control channel scheduling a reception of the contention resolution message.

2. The method according to claim 1, wherein the random access response message comprises information on a control channel used to transmit information for retransmission of the uplink signal.

3. The method according to claim 1, wherein the control channel scheduling the reception of the contention resolution message is different from a control channel scheduling a reception of the random access response message.

4. The method according to claim 1, wherein the random access response message comprises information on an uplink reference signal which is transmitted together with the uplink signal.

5. The method according to claim 1, wherein the random access response message comprises information on a downlink reference signal which is transmitted together with the contention resolution message.

6. The method according to claim 1, wherein the plurality of nodes are configured to transceive a signal with the user equipment using a CoMP (coordinated multi point) scheme.

7. A user equipment in a wireless communication system, the user equipment comprising:

a wireless communication module configured to transceive a signal with at least one of a plurality of nodes including a serving cell; and
a processor configured to process the signal,
wherein the processor is further configured to:
transmit, via the wireless communication module, a random access preamble signal to the at least one of the plurality of nodes,
receive, via the wireless communication module, a random access response signal from the serving cell,
transmit, via the wireless communication module, an uplink signal to a different node excluding the serving cell among the plurality of nodes, and
receive, via the wireless communication module, a contention resolution message from the different node, and
wherein the random access response message comprises information indicating transmitting the uplink signal to the different node, information indicating receiving the contention resolution message from the different node and information on a control channel scheduling a reception of the contention resolution message.

8. The user equipment according to claim 7, wherein the random access response signal comprises information on a control channel used to transmit information for retransmission of the uplink signal.

9. The user equipment according to claim 7, wherein the control channel scheduling the reception of the contention resolution signal is different from a control channel scheduling a reception of the random access response signal.

10. The user equipment according to claim 7, wherein the random access response signal comprises information on an uplink reference signal which is transmitted together with the uplink signal.

11. The user equipment according to claim 7, wherein the random access response signal comprises information on a downlink reference signal which is transmitted together with the contention resolution message.

12. The user equipment according to claim 7, wherein the plurality of nodes are configured to transceive a signal with the user equipment device using a CoMP (coordinated multi point) scheme.

* * * * *